United States Patent
Zheng et al.

(10) Patent No.: US 10,783,369 B2
(45) Date of Patent: Sep. 22, 2020

(54) DOCUMENT VERIFICATION SYSTEM, DEVICE, AND METHOD USING A CLASSIFICATION MODEL

(71) Applicant: ALIBABA GROUP HOLDING LIMITED, Grand Cayman (KY)

(72) Inventors: Dandan Zheng, Hangzhou (CN); Wei Xu, Hangzhou (CN); Liang Li, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 16/736,962

(22) Filed: Jan. 8, 2020

(65) Prior Publication Data

US 2020/0143162 A1    May 7, 2020

Related U.S. Application Data

(63) Continuation of application No. PCT/CN2018/099915, filed on Aug. 10, 2018.

(30) Foreign Application Priority Data

Oct. 20, 2017 (CN) .......................... 2017 1 0985755

(51) Int. Cl.
    *G06K 9/00* (2006.01)
(52) U.S. Cl.
    CPC ..... *G06K 9/00577* (2013.01); *G06K 9/00288* (2013.01); *G06K 2009/0059* (2013.01)
(58) Field of Classification Search
    None
    See application file for complete search history.

(56) References Cited

U.S. PATENT DOCUMENTS

| 7,251,347 B2 * | 7/2007 | Smith | G06K 9/00577 340/5.8 |
| 8,144,368 B2 * | 3/2012 | Rodriguez | G07D 7/0034 358/1.12 |

(Continued)

FOREIGN PATENT DOCUMENTS

| CN | 101877131 A | 11/2010 |
| CN | 102713930 A | 10/2012 |

(Continued)

OTHER PUBLICATIONS

PCT International Search Report and the Written Opinion dated Nov. 8, 2018, issued in related International Application No. PCT/CN2018/099915, with partial English translation (9 pages).

(Continued)

*Primary Examiner* — Tahmina N Ansari

(57) ABSTRACT

Disclosed in the application are document verification and identity verification methods and devices. A computer-implemented document verification method comprises: obtaining an image of a to-be-verified document; and verifying whether an anti-counterfeiting identifier exists in the image; verifying a source of the image; and obtaining a verification result for the to-be-verified document based on the verification of the anti-counterfeiting identifier and the verification of the source of the image. A computer-implemented identity verification method comprises: obtaining an image of an identity document of a to-be-verified user; obtaining a first verification result for the identity document based on the image of the identity document; verifying authenticity of identity information in the image of the identify document to obtain a second verification result; and determining an identity verification result for the to-be-verified user based on the first verification result and the second verification result.

20 Claims, 3 Drawing Sheets

(56) References Cited

U.S. PATENT DOCUMENTS

| | | | |
|---|---|---|---|
| 8,249,350 B2* | 8/2012 | Voloshynovskyy | G07D 7/005 |
| | | | 283/113 |
| 8,422,743 B2* | 4/2013 | Shimizu | G07D 7/128 |
| | | | 162/140 |
| 8,988,666 B2 | 3/2015 | Furness, III et al. | |
| 9,058,580 B1 | 6/2015 | Amtrup et al. | |
| 9,137,020 B1 | 9/2015 | Fraser | |
| 9,147,127 B2 | 9/2015 | Shu | |
| 9,256,720 B2 | 2/2016 | Berini et al. | |
| 9,384,518 B2 | 7/2016 | Chung | |
| 9,391,986 B2 | 7/2016 | Schultz et al. | |
| 9,406,067 B1 | 8/2016 | Robinson et al. | |
| 9,495,586 B1 | 11/2016 | Hagen et al. | |
| 9,785,793 B2 | 10/2017 | Lacey | |
| 10,013,766 B2 | 7/2018 | King et al. | |
| 10,395,019 B2 | 8/2019 | King | |
| 10,474,891 B2 | 11/2019 | Eckel et al. | |
| 10,484,386 B2 | 11/2019 | Storr | |
| 2004/0263911 A1* | 12/2004 | Rodriguez | G06T 1/0021 |
| | | | 358/3.28 |
| 2005/0230959 A1 | 10/2005 | Nemeth | |
| 2013/0033640 A1 | 2/2013 | Lee | |
| 2015/0227946 A1 | 8/2015 | Huang | |
| 2015/0379256 A1 | 12/2015 | Parry et al. | |
| 2016/0191518 A1 | 6/2016 | Bud | |
| 2017/0046563 A1 | 2/2017 | Kim et al. | |
| 2017/0061563 A1 | 3/2017 | Falkenstem et al. | |
| 2017/0140174 A1 | 5/2017 | Lacey et al. | |
| 2017/0236034 A1 | 8/2017 | Dolev | |
| 2018/0046856 A1 | 2/2018 | Kapczynski | |
| 2019/0026581 A1* | 1/2019 | Leizerson | G06K 9/2027 |
| 2019/0278977 A1 | 9/2019 | Zheng et al. | |

FOREIGN PATENT DOCUMENTS

| | | |
|---|---|---|
| CN | 102801528 A | 11/2012 |
| CN | 103257801 A | 8/2013 |
| CN | 103745474 A | 4/2014 |
| CN | 103854265 A | 6/2014 |
| CN | 105118048 A | 12/2015 |
| CN | 105681316 A | 6/2016 |
| CN | 106157405 A | 11/2016 |
| CN | 106204048 A | 12/2016 |
| CN | 106778525 A | 5/2017 |
| CN | 106803086 A | 6/2017 |
| CN | 106886774 A | 6/2017 |
| CN | 106981016 A | 7/2017 |
| CN | 107016608 A | 8/2017 |
| CN | 107071281 A | 8/2017 |
| CN | 107170068 A | 9/2017 |
| CN | 107729847 A | 2/2018 |
| CN | 107832679 A | 3/2018 |
| CN | 107944339 A | 4/2018 |
| EP | 3257223 B1 | 12/2019 |
| TW | I254673 B | 5/2006 |

OTHER PUBLICATIONS

Search Report dated Aug. 8, 2019, issued in related Taiwan Application No. 107128954 (1 page).

First Search dated Jan. 14, 2020, issued in related Chinese Application No. 201710985755.5 (1 page).

Supplementary Search dated Mar. 20, 2020, issued in related Chinese Application No. 201710985755.5 (1 page).

International Preliminary Report on Patentability Chapter I for PCT Application No. PCT/CN2018/099915 dated Apr. 30, 2020.

Supplementary Search for Chinese Application No. 201710985755.5 dated Apr. 29, 2020.

Supplementary Search for Chinese Application No. 201710985755.5 dated Jun. 23, 2020.

Huang Weijie, The Embedded system for intelligent video monitoring in UAV, Shenyang University, Mar. 5, 2013 with English Abstract.

* cited by examiner

DOCUMENT VERIFICATION SYSTEM, DEVICE, AND METHOD USING A CLASSIFICATION MODEL

CROSS-REFERENCE TO RELATED APPLICATIONS

The present application is a continuation application of International Patent Application No. PCT/CN2018/099915, filed on Aug. 10, 2018, which is based on and claims priority to the Chinese Patent Application No. 201710985755.5, filed on Oct. 20, 2017 and entitled "DOCUMENT VERIFICATION AND IDENTITY VERIFICATION METHOD AND DEVICE." The above-referenced applications are incorporated herein by reference in their entirety.

TECHNICAL FIELD

The application relates to the field of Internet technologies, and in particular, to a document verification and identity verification method and device.

BACKGROUND

In the age of Internet, it has become increasingly convenient for users to manage business. For example, users may operate on terminal devices to handle desired business. However, since some business requires a very high level of security, the authenticity, integrity, and compliance of the information and supporting documents provided by a user need to be carefully reviewed to block users with unlawful intent. Therefore, the business must be handled offline through a particular business handling system.

For example, due to rampant forgery and re-make of documents, a user is typically asked to present an identity card to staff at a counter, and the staff at the counter uses a professional authorization machine to read the chip in the identity card for online check.

Although solutions according to the current technologies may solve the problems of document forgery and re-make to a certain extent, the demand for online handling of these business still cannot be met. Therefore, there is a need for more reliable solutions.

SUMMARY

Embodiments of the specification provide document verification and identity verification methods and devices to solve the problem that identity verification solutions according to the current technologies cannot meet the level of security required by online handling of business.

Embodiments of the specification provide a computer-implemented document verification method, comprising: obtaining an image of a to-be-verified document; and verifying whether an anti-counterfeiting identifier exists in the image; verifying a source of the image; and obtaining a verification result for the to-be-verified document based on the verification of the anti-counterfeiting identifier and the verification of the source of the image.

In some embodiments, verifying whether an anti-counterfeiting identifier exists in the image comprises: determining a type of anti-counterfeiting identifier corresponding to a type of the to-be-verified document; and determining a probability at which an anti-counterfeiting identifier corresponding to the determined type of anti-counterfeiting identifier exists in the image.

In some embodiments, the type of anti-counterfeiting identifier comprises at least one of watermark text, microtext, shading lines, gravure printing, color cast, anti-counterfeiting secret marks, or fonts.

In some embodiments, verifying a source of the image comprises: analyzing data of the image to determine a probability at which the image is from a physical document.

In some embodiments, analyzing data of the image to determine a probability at which the image is from a physical document comprises: performing image recognition processing on data of an individual frame in the image.

In some embodiments, analyzing data of the image to determine a probability at which the image is from a physical document comprises: obtaining at least two types of images of the to-be-verified document; performing differencing processing on data of the at least two types of images to obtain image difference; and using the image difference as an input to a pre-established classification model, the classification model being trained to output a verification result of the source of the image based on the input image difference.

In some embodiments, verifying an anti-counterfeiting identifier in the image comprises: determining a type of anti-counterfeiting identifier corresponding to a type of the to-be-verified document; determine a probability at which an anti-counterfeiting identifier corresponding to the determined type of anti-counterfeiting identifier exists in the image; and wherein obtaining a verification result for the to-be-verified document based on the verification of the anti-counterfeiting identifier and the verification of the source of the image comprises: determining the verification result based on the probability at which an anti-counterfeiting identifier corresponding to the determined type of anti-counterfeiting identifier exists in the image and the probability at which the image is from a physical document.

In some embodiments, verifying a source of the image comprises: collecting a background image before or after obtaining the image of the to-be-verified document; verifying the image of the to-be-verified document based on the background image to determine whether the image of the to-be-verified document and the background image are from a same photographing scene.

In some embodiments, verifying the image of the to-be-verified document based on the background image to determine whether the image of the to-be-verified document and the background image are from a same photographing scene comprises: comparing a background region in the image of the to-be-verified document with the background image to determine an overlapping degree between the image of the to-be-verified document and the background image, the background region in the image of the to-be-verified document being a region outside a region of the to-be-verified document in the image; and determining whether the image of the to-be-verified document and the background image are from the same photographing scene based on the overlapping degree.

In some embodiments, comparing a background region in the image of the to-be-verified document with the background image to determine an overlapping degree between the image of the to-be-verified document and the background image comprises: comparing the background region in the image of the to-be-verified document with the background image based on first position information of a gyroscope of a device when the device collects the image of the to-be-verified document and second position information of the gyroscope of the device when the device collects the background image.

Embodiments of the specification further provide a computer-implemented identity verification method, comprising: obtaining an image of an identity document of a to-be-verified user; obtaining a first verification result for the identity document based on the image of the identity document; verifying authenticity of identity information in the image of the identify document to obtain a second verification result; and determining an identity verification result for the to-be-verified user based on the first verification result and the second verification result.

In some embodiments, obtaining an image of an identity document of a to-be-verified object comprises: collecting the image of the identity document of the to-be-verified user on site.

In some embodiments, obtaining an image of an identity document of a to-be-verified user comprises: obtaining the image of the identity document of the to-be-verified user that has been collected in advance.

In some embodiments, verifying authenticity of identity information in the image of the identify document to obtain a second verification result comprises: performing online check on the identity information in the image of the identify document to determine the authenticity of the identity information.

In some embodiments, performing online check on the identity information in the image of the identify document to determine the authenticity of the identity information comprises: performing the online check on text information and a documental facial image in the identity information, respectively.

In some embodiments, before performing the online check on the documental facial image in the identity information, the method further comprises: collecting a facial image of the to-be-verified user on site; and wherein performing the online check on the documental facial image in the identity information comprises: performing cross-verification on the documental facial image, the facial image of the to-be-verified user and a facial image obtained from the online check.

In some embodiments, before performing online check on the identity information in the image of the identify document to determine the authenticity of the identity information, the method further comprises: performing liveness detection based on the facial image of the to-be-verified user to obtain a liveness detection result; and wherein performing online check on the identity information in the image of the identify document to determine the authenticity of the identity information comprises: determining the authenticity of the identity information based on the result of the online check and the liveness detection result.

In some embodiments, determining an identity verification result for the to-be-verified user based on the first verification result and the second verification result comprises: in response to that the second verification result is failure, determining that the identity verification result is failure; alternatively, in response to that the second verification result is successful, determining whether the identity verification result is successful based on the first verification result.

In some embodiments, determining an identity verification result for the to-be-verified user based on the first verification result and the second verification result comprises: in response to that the second verification result is successful, determining a probability at which the identity verification result is successful based on the first verification result.

Embodiments of the specification further provide an identity verification device, comprising: one or more processors and one or more non-transitory computer-readable memories coupled to the one or more processors and configured with instructions executable by the one or more processors to cause the device to perform operations comprising: obtaining an image of an identity document of a to-be-verified user; verifying a source of the image of the identify document and/or an anti-counterfeiting identifier in the image of the identify document to obtain a first verification result; verifying authenticity of identity information in the image of the identify document to obtain a second verification result; and determining an identity verification result for the to-be-verified user based on the first verification result and the second verification result.

Embodiments of the specification further provide an identity verification device, comprising: one or more processors and one or more non-transitory computer-readable memories coupled to the one or more processors and configured with instructions executable by the one or more processors to cause the device to perform operations comprising: obtaining an image of a to-be-verified document; and verifying whether an anti-counterfeiting identifier exists in the image; verifying a source of the image; and obtaining a verification result for the to-be-verified document based on the verification of the anti-counterfeiting identifier and the verification of the source of the image.

At least one of the embodiments of the specification can achieve the following beneficial effects. Compared with solutions in the current technologies that use professional authorization machines to achieve identity verification, the embodiments of the specification verify the authenticity of images of the identity documents and the authenticity of identity information in the images of the identity documents, and therefore, can effectively solve the problems of document content forgery, document re-make, and the like without using a professional authorization machine, thereby providing an identity verification capability that meets a required security level for online handling of business.

BRIEF DESCRIPTION OF THE DRAWINGS

The accompanying drawings described herein are used to provide further understanding of the application and constitute a part of the application. The embodiments of the application and the description thereof are used to describe the application and do not constitute improper limitations to the application. In the accompanying drawings.

DETAILED DESCRIPTION

To make the objectives, technical solutions and advantages of the application clearer, the technical solutions of the application will be clearly and completely described below with reference to embodiments of the application and corresponding accompanying drawings. The described embodiments are merely some, but not all, embodiments of the application. All other embodiments obtained, based on some embodiments of the application, by one of ordinary skill in the art without creative effort shall fall within the protection scope of the application.

Figure 1:
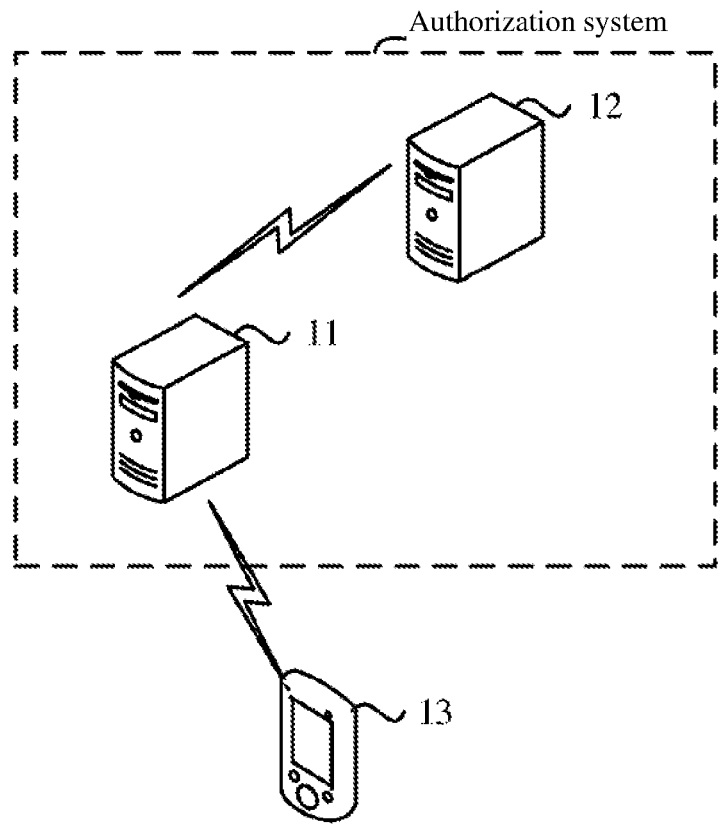
FIG. 1 is a schematic diagram of an application scenario of some embodiments of the specification.

Referring to FIG. 1, an application scenario of some embodiments of the specification is illustrated. In this scenario, when a user is handling some business, relevant information may be filled in through an application (APP) in a terminal device 13. When a preset condition is met, an image of a document of the user may be collected and uploaded to a device 12 and/or a device 11 of a business authorization system. For example, the document may be an identity document, or other types of document for verifying information of the holding person (e.g., the user holding the document for handling the business). The image of the document may be referred to as a document image; and an image of an identity document may be referred to as an identity document image hereinafter, for conciseness. In some embodiments, the identity document may be the user's identity card. The identity document image may be an image of the user's identity card. The device 12 and/or the device 11 perform verification on the document image and respond to the business handled by the user based on a verification result. The business may be various business that can be handled online, such as remote account opening. Alternatively, the business may be handled offline or by online operations as well as offline operations.

Another application scenario of some embodiments of the specification may be as follows. A user presents an identity document image to a client of an authorization system via a terminal device; alternatively, the user presents an identity document to the client of the authorization system and the client collects an image of the identity document (also referred to as an identity document image). Then, the client uploads the identity document image to a server of the authorization system, the server verifies the identity document image and returns a verification result to the client, and the client determines whether to authorize the user based on the verification result.

For example, the above-described process may take place in a process of a user passing through security check, logging into a platform that requires authorization, and the like. In addition, whether the user handling the business is required to be the same as the user corresponding to the identity document depends on provisions of the party offering the business.

In addition to the two application scenarios illustrated above, application scenarios of some embodiments of the specification may also be various other scenarios, upon which no limitation will be placed herein. Any scenario in which the embodiments according to the specification can be applied may be used. Technical solutions according to various embodiments of the application will be described in detail below with reference to the accompanying drawings.

Figure 2:
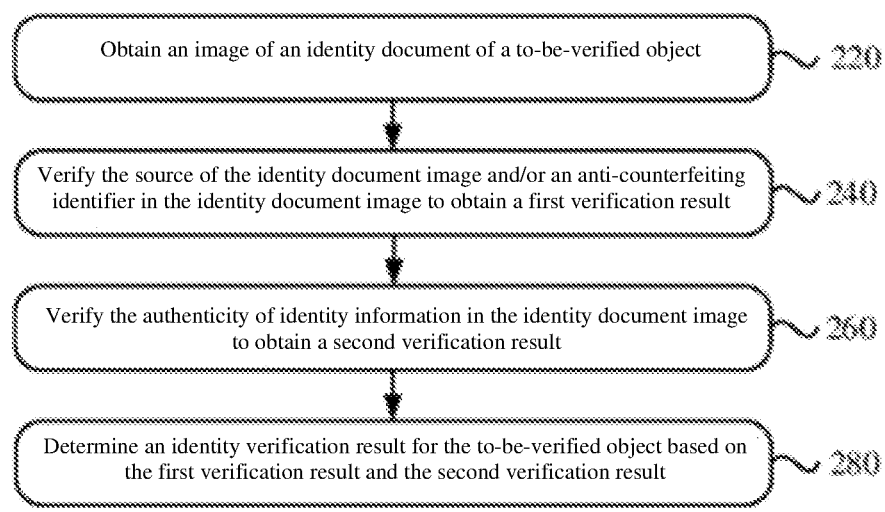
FIG. 2 is a schematic flow chart of an identity verification method according to some embodiments of the specification.

FIG. 2 is a schematic flow chart of an identity verification method according to some embodiments of the specification. Referring to FIG. 2, the method may, for example, comprise the following steps: Steps 220-280.

Step 220. Obtain an image of an identity document of a to-be-verified object.

For example, the identity document image may be an image obtained by taking a photo of an identity document. The to-be-verified object may be a user holding the identity document for handling business online or offline. The identity document may be a document capable of proving the identity of the to-be-verified object (e.g., the user), such as an identity card, a temporary identity card, an education certificate, a driver license, and the like. The identity document comprises identity information of the to-be-verified object, such as a name, an identity card number, a student number, and the like.

In some embodiments, the step 220 may be: collecting an image of the identity document of the to-be-verified object on site. The "site" is the place where the identity is to be verified. For example, the site may be the place where the identity is verified for business to be handled, such as the site where an image of the identity card of the to-be-verified object is collected for opening an account, or may be a site not for handling business, such as the site where an image of a relevant document of the to-be-verified object is collected for passing through security check.

With reference to FIG. 1, collecting an image of the identity document on site may be implemented by the following manner. For example, a user actively opens a photo-taking interface on a terminal device; alternatively, in response to an operation of the user, the authorization system calls a camera application of the terminal device to open the photo-taking interface; and then the terminal device takes a photo of the identity document of the to-be-verified object to obtain an image of the identity document.

Alternatively, the step 220 may be implemented by: obtaining an image of the identity document of a to-be-verified object that has been collected in advance. The term "in advance" is used to differentiate from the term "on site" in the above-described embodiments of the step 220. The embodiments of the step 220 may include, for example, storing identity document images that have been collected previously at a preset location, and when identity verification is required, obtaining a corresponding identity document image based on a storage address.

Step 240. Verify the source of the identity document image and/or an anti-counterfeiting identifier in the identity document image to obtain a first verification result.

The source of the identity document image in this step may be a variety of sources. For example, the image may be obtained by taking a photo of a physical identity document, an identity document photo that is photoshopped or not photoshopped, a photocopy of the identity document, a screen print of a digital copy of the identity document, an image with a pre-determined photographing scene, and the like. The anti-counterfeiting identifier may be an identifier that can be attached, printed or thermally transferred to a surface, a package, or an attachment (e.g., a product label, a business card, and anti-counterfeiting card) of an object and plays an anti-counterfeiting role. For example, an anti-counterfeiting identifier on an identity card may include a national emblem, a card name, an image of the Great Wall, the agency that issues the card, a validity term, a color pattern, and the like.

Since different business requires different levels of security, different legal sources and integrity of anti-counterfeiting identifiers may be selectively set. For business with relatively high requirements for the level of security, for example, remote account opening, the following conditions may be required: the source of an identity document image is a physical identity document with a complete anti-counterfeiting identifier, or the probability of meeting this condition reaches some threshold. For business with relatively low requirements for the level of security, the condition to be satisfied may be less strict.

The implementation of the step 240 will be described through examples below by taking "remote account opening" as an example. First, verifying the source of the identity document image in the step 240 will be described through examples. The step 240 may comprise: verifying whether the identity document image is from a physical document and verifying whether the identity document image and the image collected on site are from the same photographing environment. Then, multiple embodiments are described herein for implementing the step 240 of verifying the source of the identity document image, on the basis of which one of ordinary skill in the art may expand to other embodiments, and all the embodiments fall within the protection scope of the application.

Some embodiments of the step 240 may be applicable to scenarios with relatively high requirements for the level of security, for example, requiring that an identity document image has a complete anti-counterfeiting identifier, or the probability of meeting this condition reaches some threshold. For example, the embodiments of step 240 may include: determining a type of anti-counterfeiting identifier corresponding to the type of the identity document or the type of the identity document image; and verifying an anti-counterfeiting identifier in the identity document image based on the determined anti-counterfeiting identifier a result of the verification of the anti-counterfeiting identifier, and determining a first verification result based on the result of the verification of the anti-counterfeiting identifier. For example, the type of anti-counterfeiting identifier comprises at least one of watermark text, micro-text, shading lines, gravure printing, color cast, anti-counterfeiting secret marks, or fonts. In some embodiments, the result of the verification of the anti-counterfeiting identifier may include a probability at which an anti-counterfeiting identifier corresponding to the determined type of anti-counterfeiting identifier exists in the image; and the first verification result may include a probability at which the identity document image passes verification.

Different types of identity documents may correspond to different anti-counterfeiting identifiers. For example, ID cards, passports, and driver licenses all have their respective corresponding anti-counterfeiting identifiers. Correspondingly, the type of a collected identity document image may be determined based on the type of the document selected by the user when handling the business, or image recognition processing may be performed on the collected identity document image to determine the type of the identity document image.

In some embodiments, a classification model may be trained. An anti-counterfeiting identifier in an identity document image may be used as an input to the classification model, or an identity document image may be used as an input to the classification model. The classification model may output a probability at which the identity document image passes the anti-counterfeiting identifier verification. The manner of scanning an identity document image to obtain an anti-counterfeiting identifier may include, for example, identifying watermark text through light transmission inspection, and the like.

Some embodiments of the step 240 may require that the source of an identity document image is a physical identity document or the probability of meeting this condition reaches some threshold. In some embodiments, verifying the source of the identity document image may comprise: performing first verification on the identity document image to determine a probability at which the identity document image is from screen print; performing second verification on the identity document image to determine a probability at which the identity document image is from a copy; and determining a probability at which the identity document image is from a physical document based on the probability at which the identity document image is from screen print and the probability at which the identity document image is from a copy. The order of performing the first verification and the second verification is not limited herein, which may be in parallel or in series.

The first verification may be performed, for example, in the following manner. Based on a pre-determined feature, performing feature detection on a document region of the identity document image, and comparing the difference in the document regions of a normal identity document image and an identity document image obtained from screen print based on a screen Moire pattern classification model, wherein the feature may be, for example, screen Moire pattern, document watermark, glare from printing, or the like. In addition, based on a pre-determined feature, performing feature detection on a border of the identity document image, and comparing the difference of the borders of a normal identity document image and an identity document image from screen print based on a screen border classification model. For example, the identity document image from screen print may have a black border. The feature may be, for example, screen Moire pattern, document watermark, glare from printing, or the like. The document region is the region of the identity document corresponding to the identity document image.

The second verification may be performed, for example, in the following manner. Based on a pixel-level feature corresponding to a black and white copy and/or a color copy, performing feature detection on image data of the identity document image. In some embodiments, a pixel-level feature corresponding to the identity document image may be detected based on a black and white copy classification DNN model, and a probability at which the identity document image is a black and white copy may be determined. Alternatively, a pixel-level feature corresponding to the identity document image may be detected based on a color copy classification DNN model, and a probability at which the identity document image is a color copy may be determined.

After the first verification and the second verification are performed, a probability at which the source of the identity document image is an authentic physical identity document is further determined based on at least one of results output by the screen Moire pattern classification model, the screen border classification model, the black and white copy classification DNN model, and the color copy classification DNN model.

In other embodiments, verifying the source of the identity document image may comprise: analyzing image data of the identity document image to determine a first verification result, the first verification result including a probability at which the identity document image is from a physical document. An example may include the following: performing image recognition processing on image data of an individual image in the identity document image, verifying whether a pixel-level feature exists in the identity document image, and then, determining a first verification result based on whether the feature exists in the identity document image. Alternatively, the image data may be used as an input to a classification model, and a first verification result output by the classification model is obtained. The feature may be, for example, screen Moire pattern, document watermark, glare from printing, or the like.

In other examples, with at least two types of identity document images, performing differencing processing on image data of at least two types of images in the identity document image to obtain image difference; and using the image difference as an input to a pre-established classification model, the classification model being used to output the first verification result based on the input image difference. The at least two types of images may include different types of images collected in different photographing conditions, for example, a type of images collected in a natural light condition and a type of images collected with a flashlight, or types of images collected with different exposures. For example, objects of the differencing processing may be images collected in natural light conditions and images collected with a flashlight.

Some embodiments of the step 240 may require that the source of an identity document image is an authentic physical identity document and there is a complete anti-counterfeiting identifier, or the probability of meeting this condition reaches some threshold. The implementation process thereof is similar to that of the above-described embodiments. Therefore, similar parts thereof are not elaborated hereinafter. In these embodiments, step 240 may further comprises: determining a first verification result based on the probability at which the identity document image passes verification and the probability at which the document image is from a physical document, namely determining credibility of the identity document of the to-be-verified object corresponding to the identity document image.

Some embodiments of the step 240 may be applied to scenarios with relatively high requirements for the level of security, for example, requiring that the identity document image and a first background image are from the same photographing scene, or the probability of meeting this condition reaches some threshold. In some embodiments, the requirements for the level of security are related to the identity document images to be taken. For example, higher requirements require more identity document images to be taken, and require more identity document images from the same photographing scene as that of the first background image. An example may include the following: before or after executing the step 220 to obtain the image of the identity document, collecting one or more background images (hereinafter referred to as first background images), and comparing the identity document image with the one or more first background images to determine an overlapping degree between the two. For example, an overlapping degree between two images may represent the extent to which the two images are similar, which will be described in detail below.

If the overlapping degree between the two is greater than a threshold, it is determined that the two are taken under the same photographing scene. Moreover, the manner of comparison may be a comparison between an identity document image and an individual background image or may be a comparison between one background image formed by combining the background images and an identity document image.

In some embodiments, determining whether the two images are under the same photographing scene may comprise: comparing a background region in the identity document image with the first background image to obtain an overlapping degree between the identity document image and the first background image; determining the first verification result based on the overlapping degree, the first verification result including a probability at which the identity document image and the first background image are from the same photographing scene. The background region in the identity document image is a region outside the region of the identity document in the identity document image.

To further improve the verification effect and efficiency of the fourth embodiment, based on first position information of a gyroscope of a device (e.g., a mobile phone) when the device collects the image of the to-be-verified document and second position information of the gyroscope of the device when the device collects the background image, the angles of the two may be adjusted to compare the first background image and the background region of the identity document image under the same position information of the gyroscope to obtain an overlapping degree and determine a probability at which the two images are taken under the same photographing scene based on the overlapping degree.

An example is as follows: before activating to collect an image of the identity document, taking a first background image, such as an image of a table and its surroundings, when the gyroscope is under the second position information; then, when the gyroscope is under the first position information, taking an image of the identity document; subsequently, separating the document region from the background region in the identity document image, and comparing the background region with the first background image based on the position information of the gyroscope to obtain an overlapping degree. The document region is the region of the identity document in the identity document image.

Some embodiments of the step 240 may be applied to scenarios with relatively high requirements for the level of security, for example, requiring that the material of a document is the material of an authentic document, or the probability of meeting this condition reaches some threshold. An example may include the following: determining the material of a document based on image difference obtained from image data of at least two types of images, then comparing the material of the document and the material of a corresponding type of authentic documents, and determining a probability at which the document is an authentic document based on a result of the comparison as a first verification result.

In some embodiments, different types of documents may be made of different materials, while different materials of documents may lead to relatively great difference under different photographing conditions. Therefore, image difference between two types of images may be input into a trained classification model to obtain a first verification result output by the classification model.

The above several feasible embodiments may be selected or set in a cross manner reasonably based on the business to be handled and a correspondingly required level of security thereof, which will not be elaborated here.

Step 260. Verify the authenticity of identity information in the identity document image to obtain a second verification result.

In some embodiments, the step 260 may include: performing online check on identity information in the identity document image, and determining the authenticity of the identity information according to a result of the online check.

For example, the online check may be performed as follows. Based on an existing internal network and interconnection network platform of the People's Bank of China, the citizen identity information system for online checks forwards check requests sent from users of the People's Bank of China through respective front-end systems of account systems, credit systems, and anti-money laundering systems to the information sharing system of the Ministry of Public Security; receives and forwards check requests sent from users of commercial banks through respective front-end systems of comprehensive business systems; and receives and forwards check results from the information sharing system of the Ministry of Public Security.

In addition, the online checks may be performed on text information and one or more facial images in identity information of the identity document. A facial image in the identity information of the identity document may be referred to documental facial image hereinafter. The text information may include information such as a document ID, a user's name, and the like, which may be obtained through Optical Character Recognition (OCR), and the documental facial images may include head images recognized via image recognition techniques.

Step 280. Determine an identity verification result for the to-be-verified object based on the first verification result and the second verification result.

Based on the first verification result and the second verification result obtained in the step 240 and the step 260, some embodiments of this step may include: if the second verification result is failure, determining that the identity verification result is failure; alternatively, if the second verification result is successful, determining whether the identity verification result is successful based on the first verification result. For example, when the probability of passing verification that corresponds to the first verification result is lower than a preset threshold, determining that the identity verification result is failure; when the probability of passing verification that corresponds to the first verification result is higher than a preset threshold, determining that the identity verification result is successful.

Some other embodiments of this step may include: if the second verification result is successful, determining a probability at which the identity verification result is successful/failure based on the first verification result.

With regard to the two types of embodiments of the step 280, the entire flow may not be a process of sequential execution since each of the above steps may have issues of an image photographing angle, photographing quality, and the like. Therefore, embodiments of the specification may provide a decision engine to evaluate the result of the entire verification according to rules. For example, factors that influence the first verification result may comprise one or more among the following: a probability at which the identity document image passes the anti-counterfeiting identifier verification, a probability at which the identity document image is from a physical document, and a probability at which the identity document image and the onsite image are from the same scenario. Therefore, when determining a probability corresponding to the first verification result, weights may be set for the influencing factors that have effect on determining the first verification result based on conditions such as demand and experience, and the probability corresponding to the first verification result is determined based on the factors (e.g., probabilities) and their corresponding weights.

For example, the influencing factors that have effect on determining the first verification result include the probability at which the identity document image passes the anti-counterfeiting identifier verification, the probability at which the identity document image is from a physical document, and the probability at which the identity document image and the onsite image are from the same scenario, which may be, for example, 60%, 70%, and 80%, and their corresponding weights may be set to be 30%, 30%, and 40%, respectively. Then the probability corresponding to the first verification result may finally calculated to be 60%×30%+70%×30%+80%×40%=71%.

In addition, to improve the speed and efficiency of checking document authenticity, the above verification of the source of the identity document image, verification of the anti-counterfeiting identifier in the identity document image, and verification of the authenticity of identity information in the identity document image may be implemented in parallel.

In some embodiments, some of the steps may be selectively executed. For example, the step 220 to the step 240 may be executed, so as to complete the process of document verification. For example, the process may include: obtaining a document image of a to-be-verified document; verifying a source of the document image and/or an anti-counterfeiting identifier in the document image to obtain a first verification result; and determining a verification result for the to-be-verified document based on the first verification result.

Alternatively, the process may include: obtaining at least one document image of a to-be-verified document; verifying the document image to determine a probability at which the document image is from screen print; and obtaining a verification result for the to-be-verified document based on the probability at which the document image is from screen print.

In another example, the process may include: verifying the document image to determine a probability at which the document image is from a copy; and obtaining a verification result for the to-be-verified document based on the probability at which the document image is from a copy;

In still another example, the process may include: verifying the document image to determine a probability at which the document image is from screen print and a probability at which the document image is from a copy; and obtaining a verification result for the to-be-verified document based on the probability at which the document image is from screen print and the probability at which the document image is from a copy.

In yet another example, the process may include: obtaining a document image of a to-be-verified document; and verifying whether the document image and a first background image collected on site in advance are from the same photographing scene, to obtain a verification result for the to-be-verified document.

Since the process of document verification is similar to relevant description in the above step 220 and step 240, it will not be repeated herein. In addition, the above document verification examples are in parallel and may be combined in a cross manner based on actual needs. For example, the example of the "anti-counterfeiting identifier" and the example of verifying "whether the document image and a first background image collected on site in advance are from the same photographing scene" may be combined.

Therefore, the embodiments of the application perform verification on the source, anti-counterfeiting identifier and identity information of the identity document image, and can effectively solve the problems of document content forgery, document re-make, and the like without using a professional authorization machine, thereby providing an identity verification capability that meets a required security level for online handling of business.

Figure 3:
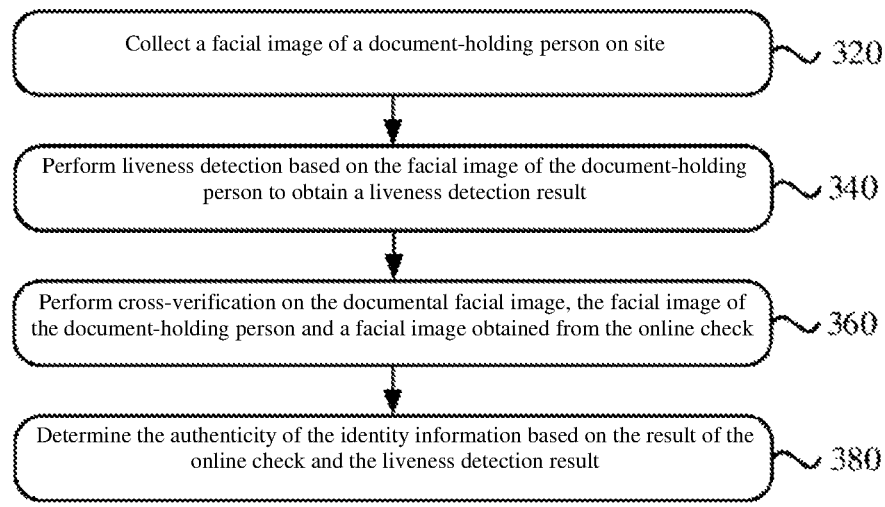
FIG. 3 is a schematic flow chart of an identity verification method according to some embodiment of the specification.

FIG. 3 is a schematic flow chart of an identity verification method according to some embodiments of the specification. Referring to FIG. 3, on the basis of the embodiments illustrated in FIG. 2, the identity verification method may, for example, further comprise the following steps: Steps 320-380.

Step 320. Collect a facial image of a document-holding person on site.

Some embodiments of the step 320 may include: while or after using a rear camera for the "on-site collection of an image of an identity document," using a front camera to collect "a facial image of a document-holding person."

Some other embodiments may include: when a probability at which the first verification result passes verification reaches a preset threshold, calling a camera to collect "a facial image of a document-holding person."

Still, some other embodiments may include: after performing online check on text information in the identity document image and obtaining a check result that the text information is authentic, calling a camera to collect "a facial image of a document-holding person."

Step 340. Perform liveness detection based on the facial image of the document-holding person to obtain a liveness detection result.

The liveness detection may be performed based on an individual image or multiple images collected in the step 320, so as to determine whether the individual image or multiple images are captured from the live document-holding person. The liveness detection may include, for example, blink detection, detection of mouth opening and closing, parallax analysis, and the like. The liveness detection techniques will not be elaborated herein.

Step 360. Perform cross-verification on a documental facial image, the facial image of the document-holding person and a facial image obtained from the online check to obtain a result of online check on the documental facial image.

Some embodiments of the step 360 may include: comparing the documental facial image in the identity document image with the facial image obtained from the online check to obtain a third verification result; comparing the documental facial image with the facial image collected on site to obtain a fourth verification result; and determining a result of online check based on the third verification result and the fourth verification result.

Step 380. Determine the authenticity of the identity information based on the result of the online check on the documental facial image and the liveness detection result, in combination with the result of online check on the text information, to obtain a second verification result.

The check result of the online check may be evaluated according to some rules, based on a decision engine in the embodiments, and according to the results of the online check on the text information and the documental facial image, and the liveness detection result. The rules may be, for example, setting weights for the check results and the result of liveness detection, and the like.

In addition, while the front camera is used to collect a facial image in the step 320, the rear camera may continue to collect one or more background images (referred to as second background images). Correspondingly, to further improve the accuracy of verifying whether the identity document image and the background image are from the same photographing scene, the identity document image, the first background image, and a second background image may be compared based on position information of the gyroscope when collecting the identity document image, the first background image, and the second background image, to determine the first verification result. The first verification result may be used to represent a probability at which the identity document image, the first background image, and the second background image are from the same photographing scene.

On the basis of the embodiments illustrated in FIG. 2, the embodiments of the specification introduce the facial image of the document-holding person collected on site and perform liveness detection on the facial image; subsequently, perform verification based on the documental facial image, the facial image of the document-holding person and the facial image obtained from the online check, and then determine the authenticity of the identity information based on the results of the liveness detection and the online check, which can obviate the problem of fake identity caused by inconsistency between the identity of the document-holding person and the identity proved by the identity document, thereby further increasing the identity verification capability.

Bodies to execute various steps of the methods provided in the embodiments of FIGS. 2 and 3 may be the same device, or the methods may be implemented by different devices as the execution bodies. For example, the execution body of the step 220 and the step 240 may be Device 1, and the execution body of the step 260 may be Device 2; in another example, the execution body of the step 220 may be Device 1, and the execution body of the step 240 and the step 260 may be Device 2, etc.

In addition, for conciseness, the above embodiments of the methods are all described as a combination of a series of actions. However, one of ordinary skill in the art should be aware that embodiments of the application are not limited to the described orders of the actions. According to the embodiments of the application, some steps may be executed in other orders or simultaneously. Further, one of ordinary skill in the art should also be aware that the embodiments described in the specification are some embodiments, and the actions involved may not be necessarily required by other embodiments of the application.

Figure 4:
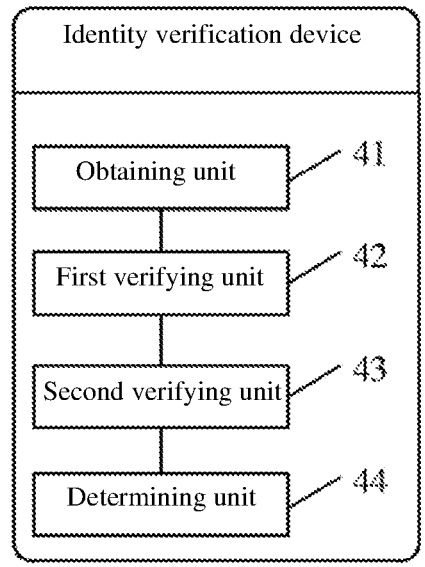
FIG. 4 is a schematic structural diagram of an identity verification device according to some embodiment of the specification.

FIG. 4 is a schematic structural diagram of an identity verification device according to some embodiment of the specification. The device comprises an obtaining unit 41, a first verifying unit 42, a second verifying unit 43, and a determining unit 44. The obtaining unit 41 is configured to obtain an image of an identity document of a to-be-verified object; the first verifying unit 42 is configured to verify a source of the identity document image and/or an anti-counterfeiting identifier in the identity document image to obtain a first verification result; the second verifying unit 43 is configured to verify the authenticity of identity information in the identity document image to obtain a second verification result; and the determining unit 44 is configured to determine an identity verification result for the to-be-verified object based on the first verification result and the second verification result.

In some embodiments, the obtaining unit 41 may be further configured to: collect an image of an identity document of a to-be-verified object on site, alternatively, obtain an image of an identity document of a to-be-verified object that has been collected in advance.

In some embodiments, the first verifying unit 42 may be further configured to: determine an anti-counterfeiting identifier in an identity document corresponding to a type of the identity document image; and verify the anti-counterfeiting identifier in the identity document image based on the determined anti-counterfeiting identifier, and obtain a first verification result based on a result of the verification of the anti-counterfeiting identifier, the first verification result including a probability at which the identity document image passes verification. In some embodiments, the anti-counterfeiting identifier comprises at least one of watermark text, micro-text, shading lines, gravure printing, color cast, anti-counterfeiting secret marks, and fonts.

In some embodiments, the first verifying unit 42 may be further configured to: perform first verification on the identity document image to determine a probability at which the identity document image is from screen print; perform second verification on the identity document image to determine a probability at which the identity document image is from a copy; and determine a probability at which the identity document image is from a physical document based on the probability at which the identity document image is from screen print and the probability at which the identity document image is from a copy.

The first verification may comprise: based on a pre-determined feature, performing feature detection on a document region and/or a frame of the identity document image; wherein the document region is the region of the identity document corresponding to the identity document image.

The second verification may comprise: based on a pixel-level feature corresponding to a black and white copy and/or a color copy, performing feature detection on image data of the identity document image.

In some embodiments, the image data of the identity document image is analyzed to determine a first verification result, the first verification result including a probability at which the identity document image is from a physical document. For example, image recognition processing may be performed on the image data of an individual image frame in the identity document image; alternatively, differencing processing may be performed on image data of at least two types of images of the identity document to obtain image difference; and the image difference is used as an input to a pre-established classification model, wherein the at least two types of images of the identity document may include different types of images collected under different photographing conditions, for example, a type of images collected in a natural light condition and a type of images collected with a flashlight, or types of images collected with different exposures.

In other embodiments, an anti-counterfeiting identifier in an identity document corresponding to the type of the identity document image is determined; the anti-counterfeiting identifier in the identity document image is verified based on the determined anti-counterfeiting identifier, and a probability at which the identity document image passes verification is determined according to a result of the verification of the anti-counterfeiting identifier; image data of the identity document image is analyzed, and a probability at which the identity document image is from a physical document is determined; and the first verification result is determined based on the probability at which the identity document image passes verification and the probability at which the identity document image is from a physical document.

In still other embodiments, it may be verified whether the identity document image and a first background image collected on site in advance are from the same photographing scene to obtain a first verification result. Verifying whether the identity document image and a first background image collected on site in advance are from the same photographing scene to obtain a first verification result may, for example, comprise: comparing a background region in the identity document image with the first background image collected on site in advance to obtain an overlapping degree between the identity document image and the first background image; determining the first verification result based on the overlapping degree, the first verification result including a probability at which the identity document image and the first background image are from the same photographing scene, wherein the background region is the region beyond the region of the identity document in the identity document image.

For example, the comparing a background region with the first background image collected on site in advance may comprises: comparing the background region with the first background image based on first position information of a gyroscope when collecting the identity document image and second position information of the gyroscope when collecting the first background image.

In another example, when a facial image of a document-holding person is collected on site, a second background image may be collected. Then, the verifying whether the identity document image and a first background image collected on site in advance are from the same photographing scene to obtain a first verification result may comprises: comparing the identity document image, the first background image, and the second background image based on position information of the gyroscope when collecting the identity document image, the first background image, and the second background image, to determine the first verification result, wherein the first verification result is used to represent a probability at which the identity document image, the first background image, and the second background image are from the same photographing scene.

In some embodiments, the second verifying unit 43 may be further configured to: perform online check on identity information in the identity document image, and determine the authenticity of the identity information according to a result of the online check, wherein online check may be performed on text information and a documental facial image in the identity information, respectively.

In some embodiments, the determining unit 44 may be further configured to: if the second verification result is failure, determine that the identity verification result is failure; alternatively, if the second verification result is successful, determine a probability at which the identity verification result is successful based on the first verification result; alternatively, if the second verification result is successful, determine whether the identity verification result is successful based on the first verification result.

Therefore, the embodiments of the application perform verification on the source, anti-counterfeiting identifier and identity information of the identity document image, and can effectively solve the problems of document content forgery, document re-make, and the like without using a professional authorization machine, thereby providing an identity verification capability that meets a required security level for online handling of business.

Figure 5:
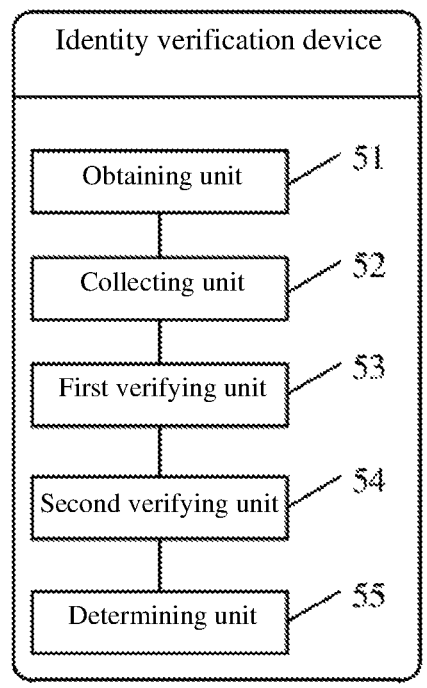
FIG. 5 is a schematic structural diagram of an identity verification device according to some embodiments of the specification.

FIG. 5 is a schematic structural diagram of an identity verification device according to some embodiment of the specification. Referring to FIG. 5, the device comprises an obtaining unit 51, a collecting unit 52, a first verifying unit 53, a second verifying unit 54, and a determining unit 55, wherein the obtaining unit 51 and the first verifying unit 53 are correspondingly similar to the obtaining unit 41 and the first verifying unit 42 in the embodiments of FIG. 4, respectively, the description of which, therefore, will not be repeated herein.

In addition to the embodiments of FIG. 4, in the present embodiment, the collecting unit 52 is configured to collect a facial image of a document-holding person on site; and the second verifying unit 54 is configured to perform cross-verification on the documental facial image in the identity information, the facial image of the document-holding person and the facial image obtained from the online check.

The second verifying unit 54 is further configured to perform liveness detection based on the facial image of the document-holding person to obtain a liveness detection result; and determine the authenticity of the identity information based on the result of the online check and the liveness detection result.

Therefore, on the basis of the embodiments illustrated in FIG. 4, the embodiments of the specification further introduce the facial image of the document-holding person collected on site and perform liveness detection on the facial image; subsequently, perform verification based on the documental facial image, the facial image of the document-holding person and the facial image obtained from the online check, and then determine the authenticity of the identity information based on the results of the liveness detection and the online check, which can obviate the problem of inconsistency between the identity of the document-holding person and the identity proved by the identity document, thereby further increasing the identity verification capability.

Since the above device embodiments are substantially similar to the method embodiments, the description of the above device embodiments is relatively concise, and the relevant parts of the method embodiments may be referenced.

With regard to the components of the device of the application, the components may be divided logically according to functions to be achieved thereby. However, the application is not limited thereto, and the components may be divided in different ways or combined as needed.

Figure 6:
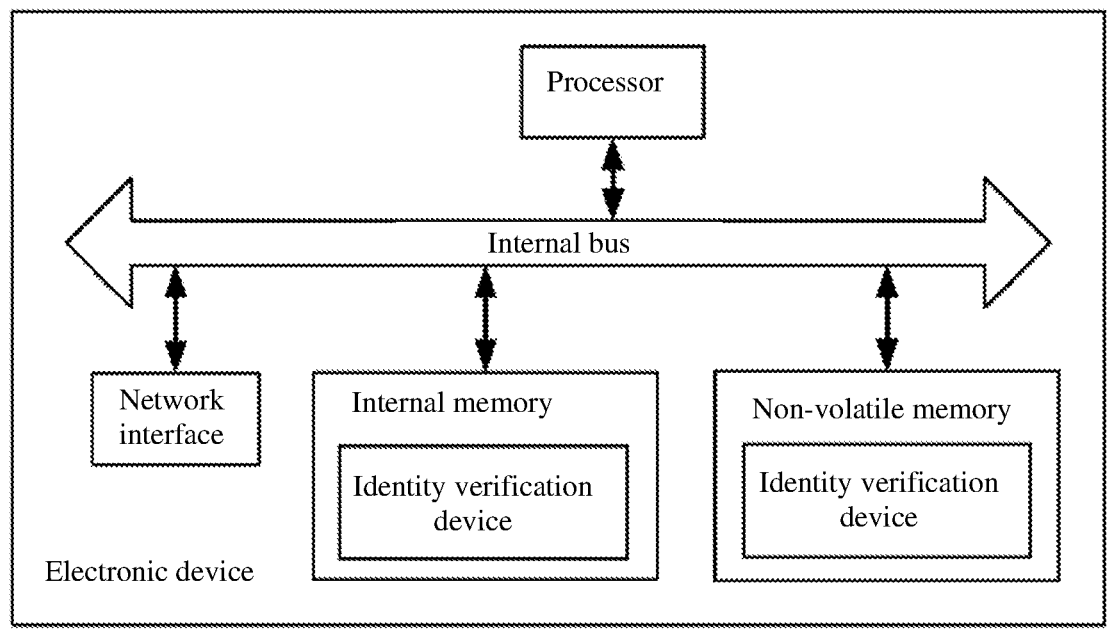
FIG. 6 is a schematic structural diagram of an electronic device according to some embodiments of the specification.

FIG. 6 is a schematic structural diagram of an electronic device according to some embodiments of the specification. Referring to FIG. 6, the electronic device comprises a processor, an internal bus, a network interface, an internal memory, and a non-volatile memory, and may also comprise hardware required by other business. The processor reads corresponding computer programs from the non-volatile memory into the internal memory, and then executes the computer programs to form an identity verification device on the logical level. In addition to the software embodiment, the specification does not exclude other embodiments, such as logic devices or a manner in which software and hardware are combined, etc. In other words, the execution body of the following processing flow is not limited to various logic units and may also be hardware or logic devices.

The network interface, the processor and the memory may be connected to each other via a bus system. The bus may be an Industry Standard Architecture (ISA) bus, a Peripheral Component Interconnect (PCI) bus, or an Extended Industry Standard Architecture (EISA) bus. The bus may be divided into an address bus, a data bus, a control bus, and the like. For convenience of description, a two-way arrow is used in FIG. 6 to represent the bus, which does not indicate that there is only one bus or one type of buses.

The memory is used for storing programs. For example, the programs may comprise program code, and the program code comprises computer operation instructions. The memory may comprise a read-only memory and a Random-Access Memory (RAM), and provide instructions and data to the processor. The memory may comprise high-speed RAM or may further comprise a non-volatile memory, such as at least one magnetic disk memory.

The processor is configured to execute the programs which are stored in the memory, the programs, when executed by the processor, may cause the processor to perform the operations including, for example, obtaining at least one document image of a to-be-verified document; verifying the document image to determine a probability at which the document image is from screen print; and obtaining a verification result for the to-be-verified document based on the probability at which the document image is from screen print.

Alternatively, the operations may include: obtaining at least one document image of a to-be-verified document; verifying the document image to determine a probability at which the document image is from a copy; and obtaining a verification result for the to-be-verified document based on the probability at which the document image is from a copy.

Alternatively, the operations may include: obtaining at least one document image of a to-be-verified document; verifying the at least one document image to determine a probability at which the document image is from screen print and a probability at which the document image is from a copy; and obtaining a verification result for the to-be-verified document based on the probability at which the document image is from screen print and the probability at which the document image is from a copy.

Alternatively, the operations may include: obtaining a document image of a to-be-verified document; and verifying whether the document image and a first background image collected on site in advance are from the same photographing scene, to obtain a verification result for the to-be-verified document.

Alternatively, the operations may include: obtaining a document image of a to-be-verified document; verifying a source of the document image and/or an anti-counterfeiting identifier in the document image to obtain a first verification result; and determining a verification result for the to-be-verified document based on the first verification result.

Alternatively, the operations may include: on the basis of the above multiple embodiments, verifying the authenticity of identity information in the identity document image to obtain a second verification result; and determining an identity verification result for the to-be-verified object corresponding to the to-be-verified document based on the verification result for the to-be-verified document and the second verification result.

The method implemented by the identity verification device disclosed by the embodiments as shown in FIGS. 2-5 of the specification or a Master node may be applied to a process or may be implemented by the processor. The processor may be an integrated circuit chip with signal processing capabilities. In an implementation process, the steps of the above method may be carried out by an integrated logic circuit of the hardware or instructions in the form of software in the processor. The above processor may be a general processor, including a Central Processing Unit (CPU), a Network Processor (NP), a Digital Signal Processor (DSP), an Application Specific Integrated Circuit (ASIC), a Field-Programmable Gate Array (FPGA), or other programmable logic devices, discrete gates or transistor logic devices, and discrete hardware components, which can implement or execute the methods, steps, and logic block diagrams disclosed in the embodiments of the specification. The general processor may be a micro-processor or the processor may also be any conventional processor. Steps of the method disclosed with reference to the embodiments of the specification may be directly executed and completed by a hardware decoding processor or executed and completed by a combination of hardware and software modules in a decoding processor. The software modules may be disposed in a mature storage medium in the art, such as a random memory, a flash memory, a read-only memory, a programmable read-only memory, or an electrically erasable programmable memory, a register and the like. The storage medium is disposed in the memory, and the processor reads information in the memory and completes the steps of the above methods in combination with the hardware thereof.

The identity verification device may further implement the method as shown in FIG. 2 or FIG. 3, and implement the method executed by the Master node.

On the basis of the same concept, embodiments of the application further provide a computer readable storage medium, the computer readable storage medium storing one or more programs, and when executed by an electronic device comprising a plurality of APPs, the one or more programs cause the electronic device to implement the identity verification methods according to the embodiments illustrated in FIGS. 2 and 3.

Embodiments of the application are described above. Other embodiments fall within the scope of the appended claims. In some situations, actions or steps stated in the claims may be executed in an order different from those in the embodiments and may still achieve the desired results. In addition, the process depicted in the accompanying drawings may not necessarily require the illustrated order or continuous order to achieve the desired results. In some embodiments, multi-task processing and parallel processing may be feasible or may be beneficial.

One of ordinary skill in the art should understand that the embodiments of the application may be provided as a method, a system, or a computer program product. Therefore, the application may be implemented as a complete hardware embodiment, a complete software embodiment, or an embodiment combining software and hardware. Moreover, the application may be in the form of a computer program product implemented on one or more computer usable storage media (including, but not limited to, a magnetic disk memory, CD-ROM, an optical memory, etc.) comprising computer usable program codes.

The application is described with reference to flowcharts and/or block diagrams of the method, device (system), and computer program product according to the embodiments of the application. It should be understood that a computer program instruction may be used to implement each process and/or block in the flowcharts and/or block diagrams and a combination of processes and/or blocks in the flowcharts and/or block diagrams. These computer program instructions may be provided for a general-purpose computer, a special-purpose computer, an embedded processor, or a processor of other programmable data processing devices to generate a machine, causing the instructions executed by a computer or a processor of other programmable data processing devices to generate an apparatus for implementing a function specified in one or more processes in the flowcharts and/or in one or more blocks in the block diagrams.

These computer program instructions may also be stored in a computer readable memory that can instruct a computer or other programmable data processing devices to work in a particular manner, causing the instructions stored in the computer readable memory to generate a manufactured article that includes an instruction apparatus. The instruction apparatus implements a function specified in one or more processes in the flowcharts and/or in one or more blocks in the block diagrams.

These computer program instructions may also be loaded onto a computer or other programmable data processing devices, causing a series of operational steps to be performed on the computer or other programmable devices, thereby generating computer-implemented processing. Therefore, the instructions executed on the computer or other programmable devices provide steps for implementing a function described in one or more processes in the flowcharts and/or in one or more blocks in the block diagrams.

In a typical configuration, the computation device includes one or more processors (CPUs), input/output interfaces, network interfaces, and a memory.

The memory may include computer readable media, such as a volatile memory, a Random Access Memory (RAM), and/or a non-volatile memory, e.g., a Read-Only Memory (ROM) or a flash RAM. The memory is an example of a computer readable medium.

Computer readable media include permanent, volatile, mobile, and immobile media, which can implement information storage through any method or technology. The information may be computer readable instructions, data structures, program modules, or other data. Examples of storage media of computers include, but are not limited to, Phase-change Random Access Memories (PRAMs), Static Random Access Memories (SRAMs), Dynamic Random Access Memories (DRAMs), other types of Random Access Memories (RAMs), Read-Only Memories (ROMs), Electrically Erasable Programmable Read-Only Memories (EEPROMs), flash memories or other memory technologies, Compact Disk Read-Only Memories (CD-ROMs), Digital Versatile Discs (DVDs) or other optical memories, magnetic cassettes, magnetic cassette and disk memories or other magnetic memory devices, or any other non-transmission media, which can be used for storing information accessible to a computation device. According to the description in the specification, the computer readable media do not include transitory media, such as modulated data signals and carriers.

It should be further noted that the terms of "including," "comprising," or any other variants of the terms are intended to encompass a non-exclusive inclusion, causing a process, method, commodity, or device comprising a series of elements to not only comprise these elements, but also comprise other elements that are not clearly listed, or further comprise elements that are inherent to the process, method, commodity, or device. When there is no further restriction, elements described by the statement "comprising one . . . " does not exclude that a process, method, commodity, or device comprising the above elements further comprises additional identical elements.

One of ordinary skill in the art should understand that the embodiments of the application may be provided as a method, a system, or a computer program product. Therefore, the application may be implemented as a complete hardware embodiment, a complete software embodiment, or an embodiment combining software and hardware. Moreover, the application may be in the form of a computer program product implemented on one or more computer usable storage media (including, but not limited to, a magnetic disk memory, CD-ROM, an optical memory, etc.) comprising computer usable program codes.

The above-described is embodiments of the application, which are not used to limit the application. To one of ordinary skill in the art, the application may have various modifications and variations. Any modification, equivalent substitution, or improvement made within the spirit and principle of the application shall be encompassed by the claims of the application.

What is claimed is:

1. A computer-implemented document verification method, comprising:
obtaining an image of a to-be-verified document;

providing the image as input to a trained classification model;
obtaining an output of the trained classification model, wherein the output represents a probability at which the image passes an anti-counterfeiting identifier verification;
verifying whether an anti-counterfeiting identifier exists in the image based on the output of the trained classification model;
performing first verification on the image to determine a probability at which the image is from a screen print;
performing second verification on the image to determine a probability at which the image is from a copy;
determining a probability at which the image is from a physical document based on the probability at which the image is from a screen print and the probability at which the image is from a copy;
verifying a source of the image based on the probability at which the image is from a physical document; and
obtaining a verification result for the to-be-verified document based on the verifying of the anti-counterfeiting identifier and the verifying of the source of the image.

2. The method according to claim 1, wherein verifying whether an anti-counterfeiting identifier exists in the image comprises:
determining a type of anti-counterfeiting identifier corresponding to a type of the to-be-verified document; and
determining a probability at which an anti-counterfeiting identifier corresponding to the determined type of anti-counterfeiting identifier exists in the image.

3. The method according to claim 2, wherein the type of anti-counterfeiting identifier comprises at least one of watermark text, micro-text, shading lines, gravure printing, color cast, anti-counterfeiting secret marks, or fonts.

4. The method according to claim 1, wherein verifying a source of the image comprises:
analyzing data of the image to determine a probability at which the image is from a physical document.

5. The method according to claim 4, wherein analyzing data of the image to determine a probability at which the image is from a physical document comprises:
performing image recognition processing on data of an individual frame in the image.

6. The method according to claim 4, wherein analyzing data of the image to determine a probability at which the image is from a physical document comprises:
obtaining at least two types of images of the to-be-verified document;
performing differencing processing on data of the at least two types of images to obtain image difference; and
using the image difference as an input to a pre-established classification model, the pre-established classification model being trained to output a verification result of the source of the image based on the input image difference.

7. The method according to claim 4, wherein verifying an anti-counterfeiting identifier in the image comprises:
determining a type of anti-counterfeiting identifier corresponding to a type of the to-be-verified document;
determining a probability at which an anti-counterfeiting identifier corresponding to the determined type of anti-counterfeiting identifier exists in the image; and
wherein obtaining a verification result for the to-be-verified document based on the verifying of the anti-counterfeiting identifier and the verifying of the source of the image comprises:
determining the verification result based on the probability at which an anti-counterfeiting identifier corresponding to the determined type of anti-counterfeiting identifier exists in the image and the probability at which the image is from a physical document.

8. The method according to claim 1, wherein verifying a source of the image comprises:
collecting a background image before or after obtaining the image of the to-be-verified document;
verifying the image of the to-be-verified document based on the background image to determine whether the image of the to-be-verified document and the background image are from a same photographing scene.

9. The method according to claim 8, wherein verifying the image of the to-be-verified document based on the background image to determine whether the image of the to-be-verified document and the background image are from a same photographing scene comprises:
comparing a background region in the image of the to-be-verified document with the background image to determine an overlapping degree between the image of the to-be-verified document and the background image, the background region in the image of the to-be-verified document being a region outside a region of the to-be-verified document in the image; and
determining whether the image of the to-be-verified document and the background image are from the same photographing scene based on the overlapping degree.

10. The method according to claim 9, wherein comparing a background region in the image of the to-be-verified document with the background image to determine an overlapping degree between the image of the to-be-verified document and the background image comprises:
comparing the background region in the image of the to-be-verified document with the background image based on first position information of a gyroscope of a device when the device collects the image of the to-be-verified document and second position information of the gyroscope of the device when the device collects the background image.

11. A document verification device, comprising:
a hardware processor; and
a non-transitory machine-readable storage medium encoded with instructions executable by the hardware processor to perform operations comprising:
obtaining an image of a to-be-verified document;
providing the image as input to a trained classification model;
obtaining an output of the trained classification model, wherein the output represents a probability at which the image passes an anti-counterfeiting identifier verification;
verifying whether an anti-counterfeiting identifier exists in the image based on the output of the trained classification model;
performing first verification on the image to determine a probability at which the image is from a screen print;
performing second verification on the image to determine a probability at which the image is from a copy;
determining a probability at which the image is from a physical document based on the probability at which the image is from a screen print and the probability at which the image is from a copy;
verifying a source of the image based on the probability at which the image is from a physical document; and obtaining a verification result for the to-be-verified document based on the verifying of the anti-counterfeiting identifier and the verifying of the source of the image.

12. The document verification device according to claim 11, wherein the verifying whether an anti-counterfeiting identifier exists in the image comprises:
   determining a type of anti-counterfeiting identifier corresponding to a type of the to-be-verified document; and
   determining a probability at which an anti-counterfeiting identifier corresponding to the determined type of anti-counterfeiting identifier exists in the image.

13. The document verification device according to claim 12, wherein the type of anti-counterfeiting identifier comprises at least one of watermark text, micro-text, shading lines, gravure printing, color cast, anti-counterfeiting secret marks, or fonts.

14. The document verification device according to claim 11, wherein the verifying a source of the image comprises:
   analyzing data of the image to determine a probability at which the image is from a physical document.

15. The document verification device according to claim 14, wherein the analyzing data of the image to determine a probability at which the image is from a physical document comprises:
   performing image recognition processing on data of an individual frame in the image.

16. A non-transitory machine-readable storage medium encoded with instructions executable by a hardware processor of a document verification device, the machine-readable storage medium comprising instructions to cause the hardware processor to perform operations comprising:
   obtaining an image of a to-be-verified document;
   providing the image as input to a trained classification model;
   obtaining an output of the trained classification model, wherein the output represents a probability at which the image passes an anti-counterfeiting identifier verification;
   verifying whether an anti-counterfeiting identifier exists in the image based on the output of the trained classification model;
   performing first verification on the image to determine a probability at which the image is from a screen print;
   performing second verification on the image to determine a probability at which the image is from a copy;
   determining a probability at which the image is from a physical document based on the probability at which the image is from a screen print and the probability at which the image is from a copy;
   verifying a source of the image based on the probability at which the image is from a physical document; and
   obtaining a verification result for the to-be-verified document based on the verifying of the anti-counterfeiting identifier and the verifying of the source of the image.

17. The non-transitory machine-readable storage medium according to claim 16, wherein the verifying whether an anti-counterfeiting identifier exists in the image comprises:
   determining a type of anti-counterfeiting identifier corresponding to a type of the to-be-verified document; and
   determining a probability at which an anti-counterfeiting identifier corresponding to the determined type of anti-counterfeiting identifier exists in the image.

18. The non-transitory machine-readable storage medium according to claim 17, wherein the type of anti-counterfeiting identifier comprises at least one of watermark text, micro-text, shading lines, gravure printing, color cast, anti-counterfeiting secret marks, or fonts.

19. The non-transitory machine-readable storage medium according to claim 16, wherein the verifying a source of the image comprises:
   analyzing data of the image to determine a probability at which the image is from a physical document.

20. The non-transitory machine-readable storage medium according to claim 19, wherein the analyzing data of the image to determine a probability at which the image is from a physical document comprises:
   performing image recognition processing on data of an individual frame in the image.

\* \* \* \* \*